(12) United States Patent
Park et al.

(10) Patent No.: US 6,727,850 B2
(45) Date of Patent: Apr. 27, 2004

(54) METHOD AND APPARATUS FOR SELECTING OPTIMAL SATELITTES IN GLOBAL POSITIONING SYSTEM

(75) Inventors: Chan-Woo Park, Seoul (KR); Jonathan P. How, Cambridges, MA (US)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/341,145

(22) Filed: Jan. 13, 2003

(65) Prior Publication Data

US 2003/0231132 A1 Dec. 18, 2003

(30) Foreign Application Priority Data

Jun. 12, 2002 (KR) .................... P2002-32955

(51) Int. Cl.[7] ................................. G01S 5/14
(52) U.S. Cl. ................................. 342/357.15
(58) Field of Search .................... 342/357.15

(56) References Cited

U.S. PATENT DOCUMENTS

| 4,928,107 | A | * | 5/1990 | Kuroda et al. | 342/357.15 |
|---|---|---|---|---|---|
| 6,278,404 | B1 | * | 8/2001 | Niles | 342/359 |
| 6,392,593 | B1 | * | 5/2002 | Pemble | 342/357.15 |
| 6,583,759 | B2 | * | 6/2003 | Pietila et al. | 342/357.15 |
| 6,642,886 | B2 | * | 11/2003 | King | 342/357.15 |
| 6,650,288 | B1 | * | 11/2003 | Pitt et al. | 342/357.15 |
| 2003/0008666 | A1 | * | 1/2003 | Ohmura et al. | 455/456 |

* cited by examiner

Primary Examiner—Gregory C. Issing
(74) Attorney, Agent, or Firm—Dilworth & Barrese LLP

(57) ABSTRACT

An apparatus and method for selecting optimal GPS satellites to locate an object. A satellite list including the coordinates of satellites is made, the redundancies of the satellites are calculated, at least one satellite having a maximum redundancy is eliminated from the satellite list, and channels of a GPS receiver are assigned to an intended number of satellites if the intended number of satellites remain in the satellite list.

11 Claims, 14 Drawing Sheets

| NUMBER OF SATELLITES TO BE SELECTED \ NUMBER OF VISIBLE SATELLITES | 6 | 7 | 8 | 9 | 10 | 11 | 12 |
|---|---|---|---|---|---|---|---|
| 4 | 15 | 32 | 70 | 126 | 210 | 330 | 495 |
| 5 | 6 | 21 | 56 | 126 | 252 | 462 | 792 |
| 6 | 1 | 7 | 28 | 84 | 210 | 462 | 924 |
| 7 | ✕ | 1 | 8 | 36 | 120 | 330 | 792 |
| 8 | ✕ | ✕ | 1 | 9 | 45 | 165 | 495 |

FIG.2
(BACKGROUND ART)

COST OF EACH MEASUREMENT

SELECTED 2 SATELLITES
IN ONE STEP WITH LOWEST COST

COST OF EACH MEASUREMENT

STEP 1:DESELECTED 1 SATELLITE WITH
THE HIGHEST COST AND CALCULATED NEW COSTS

STEP 2: DESELECTED THE SECOND SATELLITE BASED
ON THE NEW COSTS

METHOD AND APPARATUS FOR SELECTING OPTIMAL SATELITTES IN GLOBAL POSITIONING SYSTEM

This application claims priority to an application entitled "Apparatus and Method for Selecting Optimal Satellites in Global Positioning System" filed in the Korean Industrial Property Office on Jun. 12, 2002 and assigned Serial No. 2002-32955, the contents of which are hereby incorporated by reference.

BACKGROUND OF THE INVENTION

1. Field of the Invention

The present invention relates generally to GPS (Global Positioning System), and in particular, to an apparatus and method for selecting optimal GPS satellites to locate an object.

2. Description of the Related Art

Along with today's dramatic development in personal, portable communication devices, a variety of additional services are supported. In particular, some countries have mandated the use of positioning devices such as GPS in mobile terminals to provide location-based services to users.

Many GPS satellites broadcast their ephemeredes and system time, circling the earth in predetermined orbits, so that GPS receivers can determine their positions. The orbits of GPS satellites are carefully chosen so that at least four of them can be observed around the earth to allow the locations, velocities, and clock errors of the GPS receivers to be calculated. The GPS receivers can trace their positions with an error of 20 or less meters in urban areas.

Navigation data broadcasted from each satellite contains the PRN (Pseudo-Random Noise) code of the satellite corresponding to its satellite ID. Since the GPS navigation message is transmitted in CDMA (Code Division Multiple Access) format, a GPS receiver can receive the navigation data from each satellite accurately. The GPS receiver calculates its position using the navigation data. With the use of its internal algorithm, the GPS receiver tracks GPS satellite signals. Once it tracks one satellite signal, the GPS receiver can achieve information about the relative positions of other satellites using the received satellite orbit infomation. Thus the GPS receiver can track signals from all available satellites within a short period of time. Recently, the A-GPS (Assisted-GPS) is widely used which enables a GPS receiver to receive the ephemeris and timing information from a base station. Therefore, information of all available satellites is immediately available to the GPS receiver.

In general, a GPS receiver on the ground can observe 6 to 12 satellites simultaneously. To initially acquire CDMA signals from the satellites, a typical GPS receiver is required to search a wide range of frequency and code for each satellite signal. This search process is a major time-consuming factor that determines time to first fix (TTFF).

The GPS receiver can acquire at least 4 satellite signals more rapidly by assigning a plurality of independent channels to track the satellite signals. However, a system such as a small-sized portable terminal having a limited size uses a relatively small number of hardware channels and, in some cases, assigns multiple hardware channels to one satellite to reduce the TTFF.

In this case, it is difficult to track all the satellites that are visible to the GPS receiver because of the limited number of hardware channels. Thus, the GPS receiver selectively tracks a subset of visible satellites. The accuracy of a navigational solution, when a fixed number of satellites is to be selected, depends mainly on the quality of the subset (GDOP) that is being selected. Accordingly, a number of methods of selecting satellites that minimizes the positioning error of the GPS receiver (hereinafter, referred to as optimal satellites) have been proposed.

The primary requirements for optimal satellites are that they must minimize GDOP (Geometric Dilution Of Precision) and that their signals can actually be acquired through tracking. If GDOP is not minimized, position error could increase by a factor of five or more in some cases.

A unit vector pointing from a GPS receiver to a satellite i is defined as an LOS (Line-Of-Sight) vector $los_i$. If there are N visible satellites in the three-dimensional space, their coordinates can be expressed as an N×3 (x, y, z coordinates)-LOS matrix of $$H = \begin{bmatrix} x_1 & y_1 & z_1 \\ x_2 & y_2 & z_2 \\ \cdots & & \\ x_N & y_N & z_N \end{bmatrix} = \begin{bmatrix} los_1 \\ los_2 \\ \cdots \\ los_N \end{bmatrix} \quad (1)$$

where H represents line of sight matrix for N visible satellites.

When n satellites are to be selected from N number of the total visible satellites, $_NC_n$ number of satellite combinations can be produced where $_NC_n$ represents the number of combinations of the n selected satellites among the N visible satellites. Then, T (T=$_NC_n$) number of n×3 LOS matrices $h_1$, $h_2, \ldots, h_T$ are formed. The selected line of sight (LOS) matrices are represented by h. Using the $j^{th}$ combination $h_j$, the position of the GPS receiver is calculated by using the following linearized equation $$\delta\overline{\Phi} = h_j \delta\overline{x} + \overline{v} \quad (2)$$

where $\delta\overline{\Phi}$ is an (n×1) vector containing measurements received from satellites, $\delta\overline{x}$ is a three-dimensional vector with which an intended navigational solution is updated, and $\overline{v}$ is an (n×1) vector indicating the measurement noise of the satellite signals (E$\overline{v}$=0 and E$\overline{v}\overline{v}^T=\sigma^2$I. Here, $\sigma$ is the noise standard deviation and I is an identity matrix).

The estimation procedure of the $\delta\overline{x}$ is $$\delta\overline{x} = (h_j^T h_j)^{-1} h_j^T \delta\overline{\Phi} - (h_j^T h_j)^{-1} h_j^T \overline{v}$$

$$\delta\overline{x} = (h_j^T h_j)^{-1} h_j^T \delta\overline{\Phi} \quad (3)$$

The influence of the measurement error $\overline{v}$ on the navigational solution is calculated by $$v_e = (h_j^T h_j)^{-1} h_j^T \overline{v} \quad (4)$$

The statistics of the effective noise $v_e$ is $$Ev_e = E[(h_j^T h_j)^{-1} h_j^T \overline{v}] = 0$$

$$Ev_e v_e^T = E[(h_j^T h_j)^{-1} h_j^T \overline{v} \overline{v}^T h_j$$

$$(h_j^T h_j)^{-1}] = (h_j^T h_j)^{-1} \sigma^2 \quad (5)$$

From Eq. (5) GDOP is defined as $$GDOP = \sqrt{TRACE[(h_j^T h_j)^{-1}]} \quad (6)$$

Where TRACE is an operator that indicates the sum of the diagonal elements of the matrix, which is equal to the sum of all Eigen-values. It is noted from Eq. (6) that the measurement error of the GPS receiver is influenced by the geometrical positions $h_j$ of satellites. If GDOP is less than 1, the effective noise standard deviation is less than the measurement noise standard deviation. If GDOP is larger than 1, the former is higher than the latter by a multiple of GDOP. Therefore, it is desired to select the combination h that minimizes GDOP in order to achieve an optimal navigational solution.

FIG. 1 is a flowchart illustrating a conventional satellite selection method for optimal satellite selection. In the optimal satellite selection, GDOP is calculated for all possible subsets of the available satellites and the subset that minimizes the GDOP is selected by comparing the GDOPs of all possible subsets. It is assumed in this process that a GPS receiver has already received information about the relative positions of all the other satellites from an initially observed satellite.

Referring to FIG. 1, the GPS receiver calculates N unit vectors (LOS vectors) representing the three-dimensional coordinates of N available/visible satellites with respect to the GPS receiver, using the relative positions of the satellites in step S10 and generates T ($=_NC_n$) LOS combinations $h_1$, $h_2$, . . . , $h_T$ from the N LOS vectors in step S20. The GPS receiver sets a variable k to 1 in step S30. The variable k is used to identify a LOS combination. The GPS receiver calculates the GDOP for a kth combination, GDOP(k) by TRACE$(h_k^T h_k)^{-1}$ in step S40 and stores it in step S50. After calculating the GDOPs for all T number of combinations, increasing the variable by 1 at each time in step S60 until the variable k is T in step S70, the GPS receiver compares the GDOPs and chooses the LOS combination that has the minimum GDOP in step S80. Then the GPS receiver assigns channels to the PRN codes of the satellites included in the chosen LOS combination.

The GDOP calculation and storage for all the LOS combinations requires a very large number of operations including matrix inversions. FIG. 2 is a listing of numbers of matrix combinations required for the optimal satellite selection. Referring to FIG. 2, the number of matrix combinations grows by geometric progression as the number N of visible satellites and the number n of satellites to be chosen increase. Therefore, despite its effectiveness in selecting optimal satellites, the optimal satellite selection has the shortcomings of the long operation time, impossible real time operation, requirement for a large number of operation circuits, large-capacity memory requirement, great power consumption, limited integration, and the resulting limitations in application for small portable systems. Moreover, if the Galileo system, similar to GPS, already under development under ESA (European Space Agency) were to be deployed, more satellites could be observed. In such case, the number of subsets of satellites and the required operation volume would further increase.

Another conventional satellite selecting method is a highest elevation satellite selection method. In principle, this method selects the subset of satellites with the highest elevations with respect to a user. The algorithm requires very little computation. However, since satellites in only one direction may be selected, minimization of GDOP cannot be guaranteed. In real application, a GDOP achieved in this scheme is larger than a GDOP achieved in the optimal satellite selection by about 2 to 10 times, which implies that the error of a navigational solution is 2 to 10 times higher. When a GPS receiver is indoors or in an area crowded with buildings, the receiver may fail to acquire signals if it attempts to track satellites in one direction only.

SUMMARY OF THE INVENTION

It is, therefore, an object of the present invention to provide an apparatus and method for selecting GPS satellites to locate an object.

It is another object of the present invention to provide an apparatus and method for selecting GPS satellites without directional redundancy.

It is a further object of the present invention to provide an apparatus and method for selecting optimal satellites using minimum operation.

It is still another object of the present invention to provide an apparatus and method for selecting optimal satellites, suitable for small portable systems.

To achieve the above and other objects, there is provided an apparatus and method for selecting optimal GPS satellites to locate an object.

According to an aspect of the present invention, to select optimal satellites, a satellite list including the coordinates of satellites is made, the redundancies of the satellites are calculated, at least one satellite having a maximum redundancy is eliminated from the satellite list, and channels of a GPS receiver are assigned to an intended number of satellites if the intended number of satellites remain in the satellite list.

According to another aspect of the present invention, to select optimal satellites, a satellite list including the coordinates of effective satellites is made, the redundancies of the satellites are calculated, the satellite list is updated by eliminating at least one satellite having a maximum redundancy from the satellite list, the redundancy calculation and the satellite list updating are repeated for the updated satellite list until an intended number of satellites remain in the updated satellite list, and channels of a GPS receiver are assigned to the intended number of satellites if the intended number of satellites remain in the satellite list.

According to a further aspect of the present invention, in a satellite electing apparatus, an RF unit receives RF signals on channels assigned to GPS satellites, a digital unit processes the received RF signals, a processor unit selects satellites to which the channels are assigned and calculates a navigational solution using the processed signals, and a memory stores an operating program executed in the processor unit. Specifically, the processor unit makes a satellite list including the coordinates of satellites, calculates the redundancies of the satellites, eliminates at least one satellite having a maximum redundancy from the satellite list, and assigns the channels to an intended number of satellites if the intended number of satellites remain in the satellite list.

According to still another aspect of the present invention, in a satellite selecting apparatus, an RF unit receives RF signals on channels assigned to GPS satellites, a digital unit processes the received RF signals, a processor unit selects satellites to which the channels are assigned and calculates a navigational solution using the processed signals, and a memory stores an operating program executed in the processor unit. Specifically, the processor unit makes a satellite list including the coordinates of effective satellites, calculates the redundancies of the satellites included in the satellite list, updates the satellites list by eliminating at least one satellite having a maximum redundancy from the satellite list, calculates the redundancies of the satellites included in the updated satellite list, eliminates one satellite having a maximum redundancy from the updated satellite list, and assigns channels of a GPS receiver to an intended number of satellites if the intended number of satellites remain in the satellite list.

BRIEF DESCRIPTION OF THE DRAWINGS

The above and other objects, features and advantages of the present invention will become more apparent from the following detailed description when taken in conjunction with the accompanying drawings in which:

FIG. 2 is a listing of numbers of matrix combinations required for the optimal satellite selection in a conventional satellite selecting method;

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

The present invention in one embodiment pertains to selection of GPS satellites using minimum operations to locate an object. Satellites of which the relative positions have the least geometrical redundancy with respect to the other satellites are selected among visible satellites. The term "redundancy" here is not used strictly in its original sense. That is, "redundancy" indicates the closeness of a satellite to another satellite, not perfect coincidence in position between them.

Figure 1:
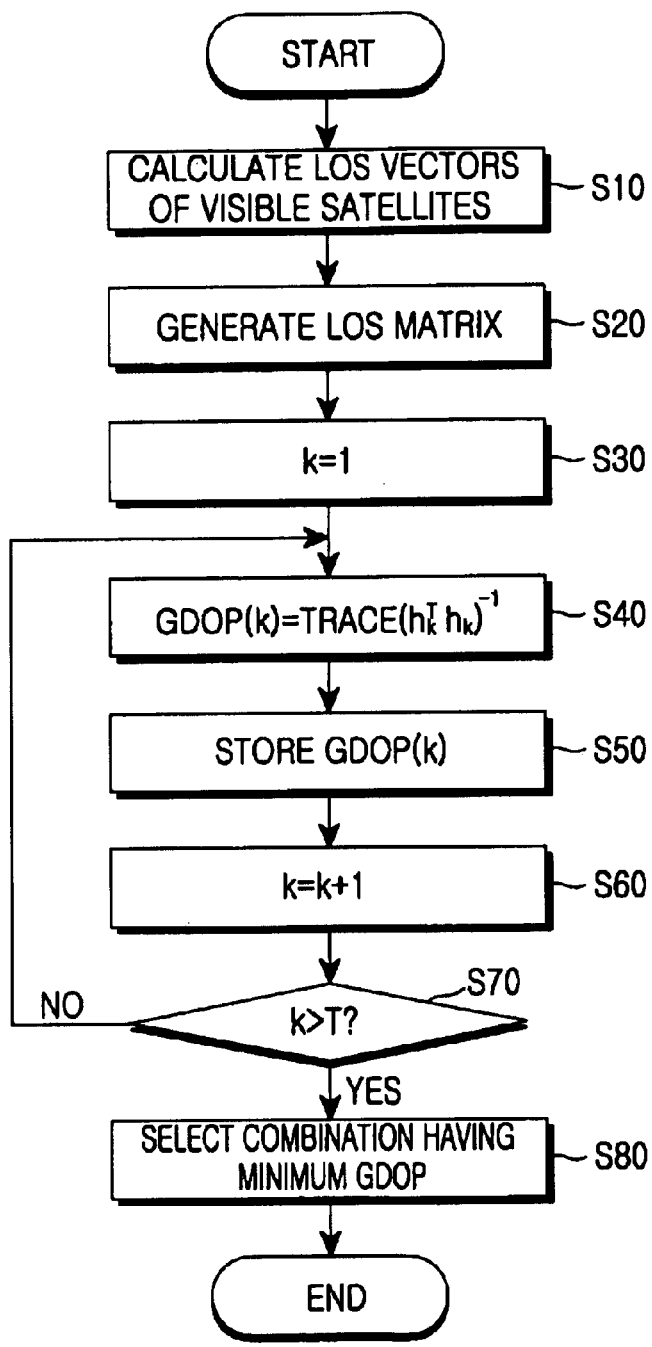
FIG. 1 is a flowchart illustrating a conventional satellite selecting method, optimal satellite selection.
Figure 3:
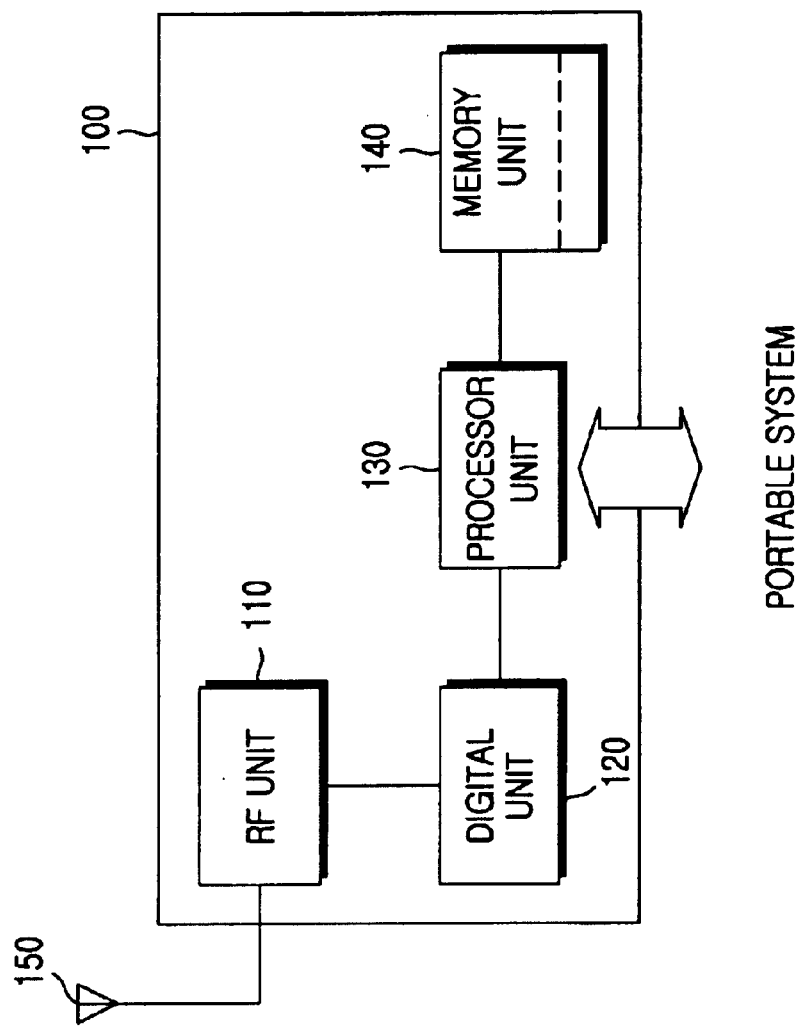
FIG. 3 is a block diagram of an example of a GPS receiver to which the present invention is applied.

FIG. 3 is a block diagram of an example of a GPS receiver to which the present invention is applied. Referring to FIG. 3, a GPS receiver 100 is self-contained and is connected to a power bus and communication buses of a portable terminal that may be located through one or more connectors (not shown). The GPS receiver 100 includes an RF (Radio Frequency) unit 110, a digital unit 120, a processor unit 130, and a memory unit 140.

The processor unit 130 exchanges commands, control commands, and data with the portable terminal via a typical interface, and provides control to and processes data for the GPS receiver 100. Related algorithms are stored in a ROM (Read Only Memory) (not shown) in the memory unit 140. Data generated during executing the algorithms is stored in a RAM (Random Access Memory) (not shown) in the memory unit 140. The processor unit 130 performs a variety of operations including management of the RF unit 110 and the digital unit 120, calculation of navigational solutions, updating a constellation almanac, and selection of optimal satellites.

Figure 4:
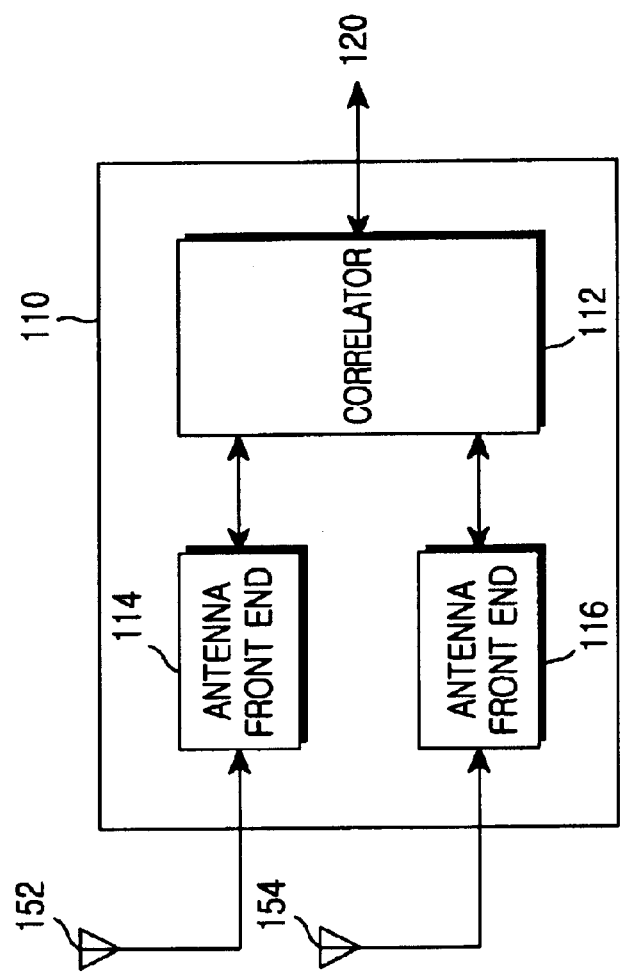
FIG. 4 is a detailed block diagram of an example of an RF unit in the GPS receiver.

FIG. 4 is a detailed block diagram of the RF unit 110. Referring to FIG. 4, the RF unit 110 includes a correlator 112, and antenna front ends 114 and 116. The antenna front ends 114 and 116 are connected to antennas 152 and 154, respectively. While only one correlator 112 is shown, a plurality of correlators connected to two or more antenna front ends may be used to reduce TTFF. The correlator 112 supports a plurality of hardware channels and mapping between the hardware channels, and the antenna front ends 114 and 116 are user-defined.

Upon reception of an overall GPS spectrum via the antenna front ends 114 and 116, the correlator 112 acquires a specific GPS signal by correlating an internally generated PN code with the received signal. The resulting digitized GPS signal is fed to the digital unit 120.

Figure 5:
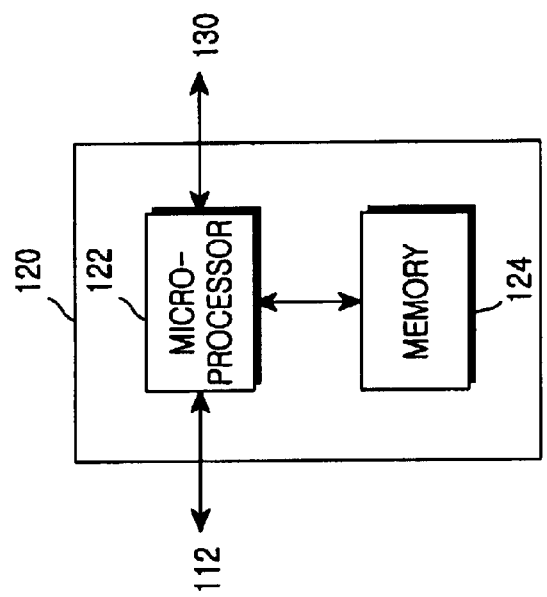
FIG. 5 is a detailed block diagram of an example of a digital unit in the GPS receiver.

FIG. 5 is a detailed block diagram of the digital unit 120. Referring to FIG. 5, the digital unit 120 comprises a microprocessor 122 and a memory 124. The memory 124 stores micro-codes needed for the microprocessor 122 to control the correlator 112 according to a command from the processor unit 130. The microprocessor 122 performs a satellite tracking algorithm using the micro-codes.

Figure 6:
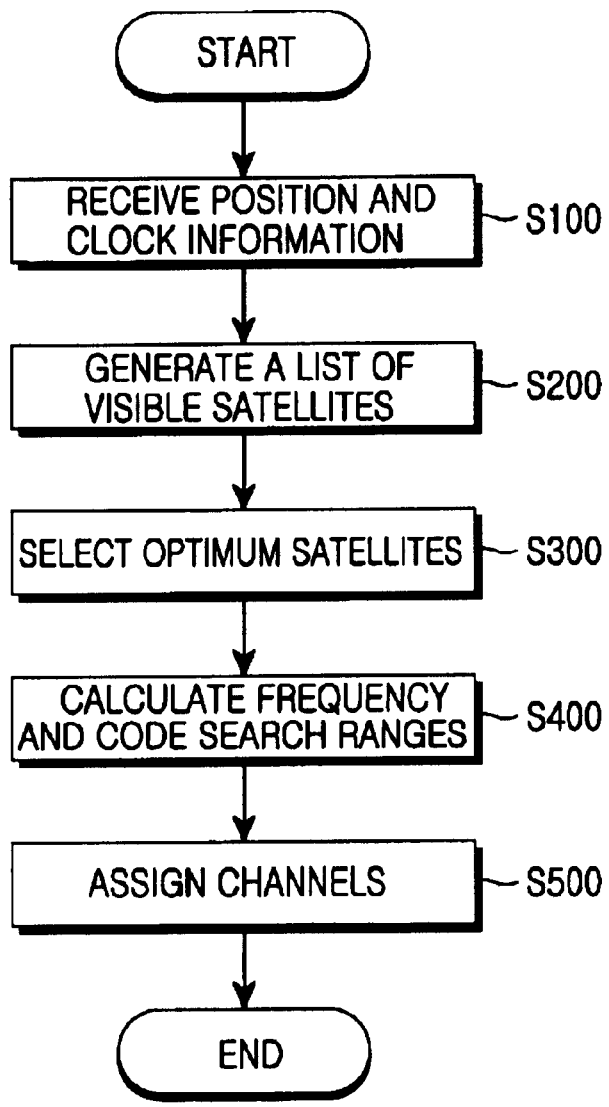
FIG. 6 is a flowchart illustrating a control operation of a processor unit in the GPS receiver.

FIG. 6 is a flowchart illustrating a control operation of the processor unit 130. Referring to FIG. 6, when the GPS receiver 100 starts to operate, the processor unit 130 collects information about a satellite constellation almanac, an approximate user position, and clock information (GPS time) from an external server (e.g., an mobile switching center) or an internal memory in step S100. The satellite constellation almanac provides information about the orbits of GPS satellites. Thus the processor unit 130 estimates the current positions of the satellites using the constellation almanac and clock information and forms a list of visible satellites according to the estimated positions and approximate user position in step S200. Visible satellites are satellites from which the GPS receiver can receive signals.

When the number of satellites to be tracked is determined in consideration of the number of hardware channels and the condition of the GPS receiver, as many optimal satellites as the determined number are chosen from the listed visible satellites in step S300. Then, the frequencies and codes of the chosen satellites, a search location, and a search range are calculated in step S400 and satellite signals are searched with channels are assigned to the chosen satellites in step S500.

Figure 7:
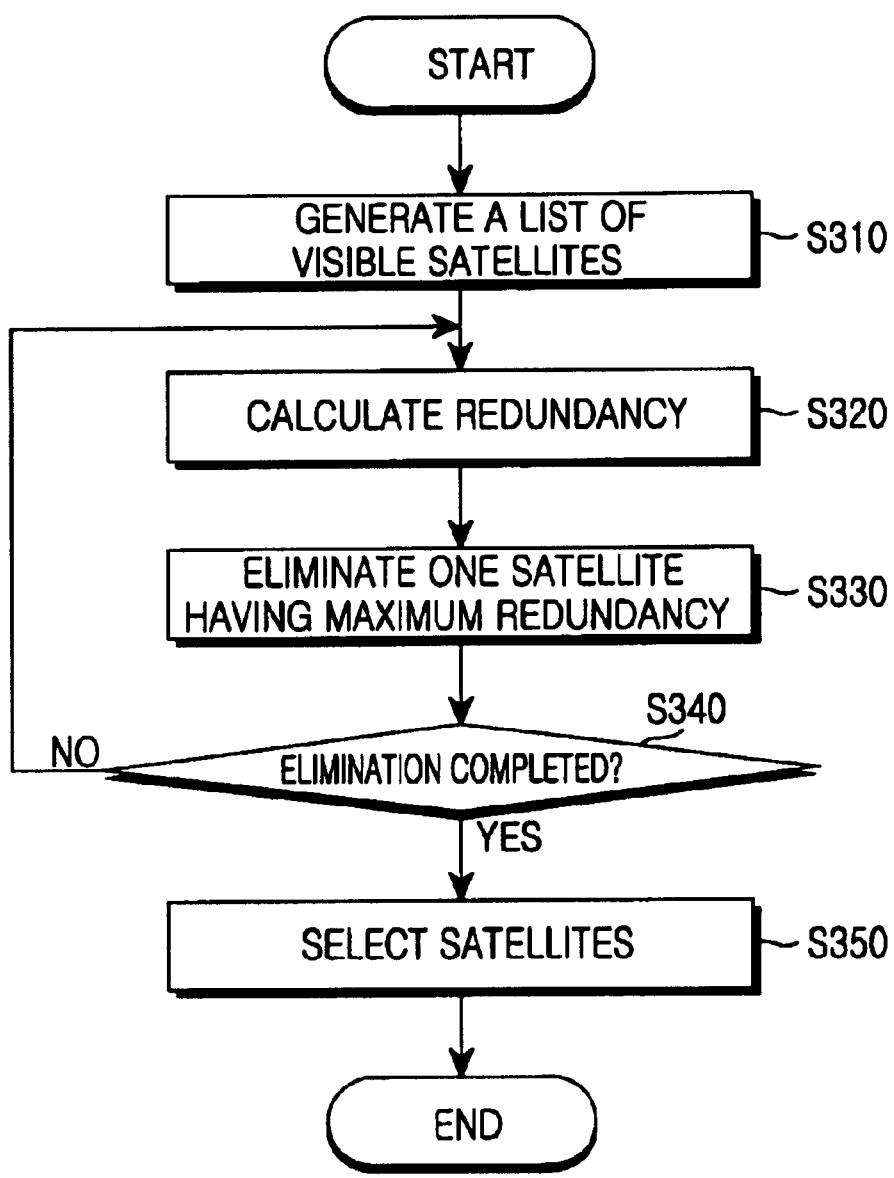
FIG. 7 is a flowchart illustrating a procedure for selecting optimal satellites according to one embodiment of the present invention.

FIG. 7 is a detailed flowchart illustrating the selection of the optimal satellites (S300 FIG. 6) according to the preferred embodiment of the present invention. An intended number of satellites are chosen by eliminating satellites with the highest redundancy levels from the satellite list. It is assumed here that the GPS receiver has already received information about the relative positions of the other satellites from an initially observed satellite.

Referring to FIG. 7, the satellite list containing the coordinates of the visible satellites is formed in step S310 and the redundancy levels of the satellites are calculated in step S320. The redundancy is here defined as the degree of geometrical overlap between a satellite and the other satellites, which will be described later in more detail.

The redundancy levels are compared and the satellite having the highest redundancy level is eliminated from the satellite list, updating the satellite list in step S330.

Then it is determined whether an intended number of satellites remain in the satellite list in step S340. If satellites are further to be eliminated, steps S320 and S330 are repeated until the intended number of satellites remain. Then channels are assigned to the satellites of the final updated satellite list in step S350.

Hereinbelow, a detailed description will be made of the principle of satellite selection according to the present invention.

Let the LOS vectors representing the three-dimensional coordinates of two GPS satellites i and j with respect to the GPS receiver be $los_i$ and $los_j$, respectively. If the angle between the two vectors $los_i$ and $los_j$ is $\theta_{ij}$, the redundancy $J_{ij}$ between the two vectors is defined as $$J_{ij} = \cos 2\theta_{ij} \quad (7)$$

The redundancy $J_{ij}$ is least when the angle $\theta_{ij}$ is 90° and largest when the angle $\theta_{ij}$ is 0 or 180°. For example, if two satellites exist at 0 or 180° with respect to a GPS receiver on a two-dimensional plane, the X-axis or Y-axis coordinate of the GPS receiver is difficult to calculate. On the contrary, if the two satellites are at 90°, the all-directional coordinates of the GPS receiver are easily calculated. According to Eq. (7), as the angle between the two satellites approaches 90°, their redundancy approaches −1. If the angle approaches 0 or 180°, the redundancy approaches +1.

If the number of available satellites is N, the redundancy $J_i$ (i=1, 2, ..., N) of an ith satellite is defined as $$J_i = \sum_{j=1}^{N} \cos 2\theta_{ij} \quad (8)$$

When a satellite redundant with other satellites in relative position is chosen, the error of a navigational solution is increased. Therefore, elimination of the satellite that is geometrically most redundant with other satellites from the visible satellite list minimizes the error of the navigational solution.

Figure 8:
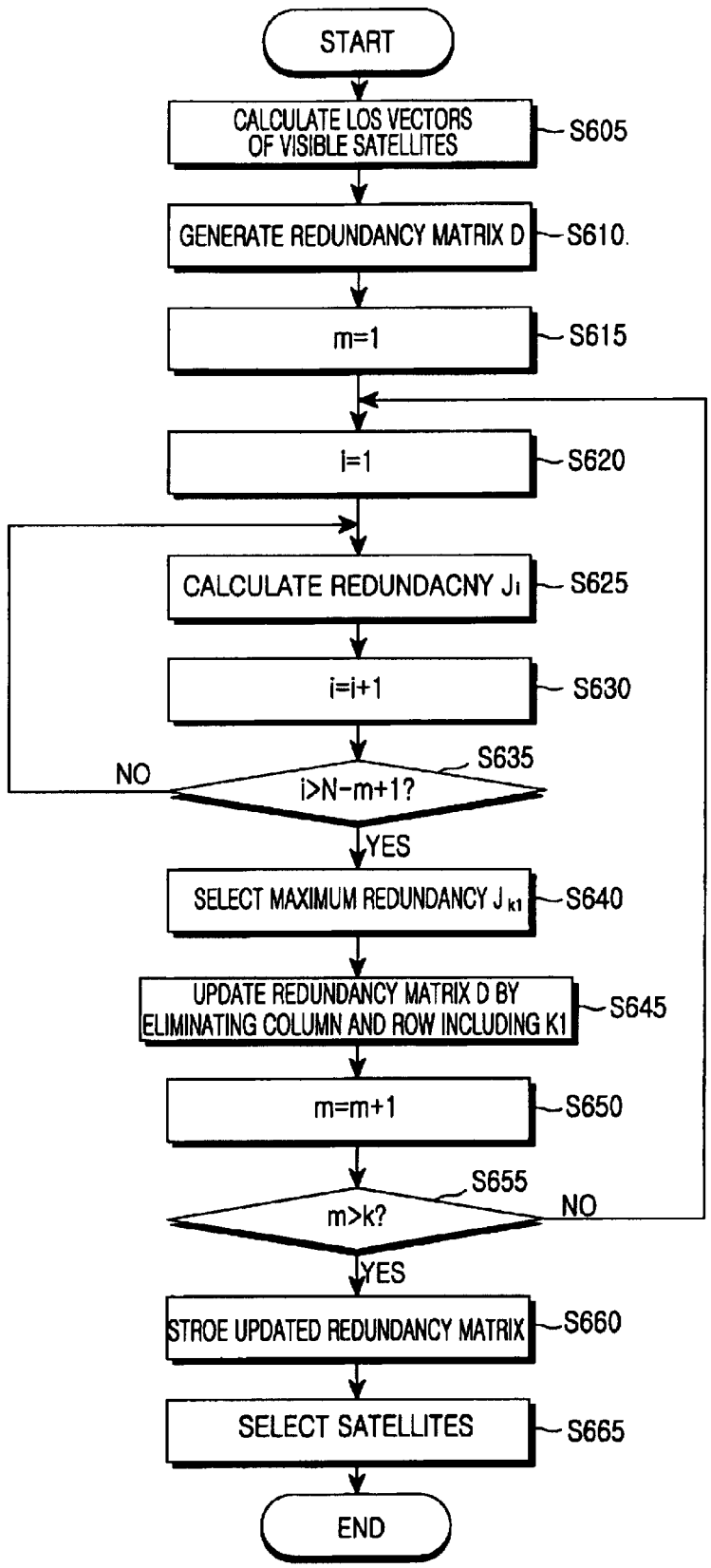
FIG. 8 is a detailed flowchart illustrating a procedure for selecting optimal satellites according to one embodiment of the present invention.

FIG. 8 is a flowchart illustrating selection of optimal satellites in more detail according to one embodiment of the present invention. Referring to FIG. 8, the GPS receiver calculates N unit vectors $los_1$, $los_2$, ..., $los_N$ representing the three-dimensional coordinates of N visible satellites with respect to the GPS receiver using their relative positions, and forms an N×3 matrix H with unit vectors in step S605. The matrix H can be understood to be a visible satellite list in the GPS receiver, expressed as $$H = \begin{bmatrix} x_1 & y_1 & z_1 \\ x_2 & y_2 & z_2 \\ \cdots \\ x_N & y_N & z_N \end{bmatrix} = \begin{bmatrix} los_1 \\ los_2 \\ \cdots \\ los_N \end{bmatrix} \quad (9)$$

From the matrix H, an N×N redundancy matrix D representing the relationship of each visible satellite with respect to the other visible satellites is generated in step 610 as $$D = \begin{bmatrix} \cos\theta_{11} & \cos\theta_{12} & & \cos\theta_{1N} \\ \cos\theta_{21} & \cos\theta_{22} & \cdots & \cos\theta_{2N} \\ & & \cdots & \\ \cos\theta_{N1} & \cos\theta_{N2} & \cdots & \cos\theta_{NN} \end{bmatrix} \quad (10)$$

Since the redundancy matrix D is symmetrical, it can be generated by calculating only the upper or lower triangular half.

If n satellites are chosen from the redundancy matrix D including the N visible satellites, k(=N−n) satellites must be eliminated from the redundancy matrix D. A variable m is set to 1 to identify a satellite to be eliminated in step S615 and a variable i is set to 1 to identify a satellite contained in the redundancy matrix D in step S620. Then, the redundancy of an ith satellite in the redundancy matrix D is calculated in step S625 by $$J_i = \sum_{j=1}^{N-m+1} \cos 2\theta_{ij} = \sum_{j=1}^{N-m+1} (2\cos^2\theta_{ij} - 1) = \sum_{j=1}^{N-m+1} (2d_{ij}^2 - 1) \quad (11)$$

That is, since an element $d_{ij}$ in the redundancy matrix D is the cosine value of the angle between the LOS vectors $los_i$ and $los_j$, the redundancy of a column or row can be achieved by squaring each element in the column or row and summing the squares. This is because (2×, −1) in $(2\cos^2\theta_{ij}-1)$ of Eq. (11) is negligible in redundancy comparison and thus can be omitted.

Redundancies are calculated completely for the redundancy matrix D by columns or rows by repeating steps S625, increasing the variable i by 1 each in step S630 time until the variable i is equal to (N−m+1) in step S635.

By comparing the redundancies, the maximum redundancy $J_{k1}$ is obtained in step S640.

$$J_{k1} = \max_i \{J_1, J_2, \ldots, J_N\} \quad (12)$$

In step S645, the redundancy matrix D is updated to an (N−m)×(N−m) redundancy matrix D' by eliminating a column and a row containing an element kl having the maximum redundancy $J_{k1}$ because exclusion of a specific satellite influences the redundancies of other satellites. For example, when two satellites are close to each other, their redundancy levels are very high. Unless a redundancy matrix is not updated after either of them is eliminated, both satellites are eliminated.

k columns and k rows are eliminated by repeating steps S620 to S645 increasing the variable by 1 each time in step S650 until the variable m is k in step S655. The resulting redundancy matrix has n columns and n rows. These steps are expressed as $$J_i' = \sum_{j=1}^{N-m+1} (2d_{ij}'^2 - 1) \quad (13)$$

$$J_{k2}' = \max_i \{J_1', J_2', \ldots, J_{N-1}'\} \quad (14)$$

where $J_i'$ is the redundancy of an ith satellite in the updated redundancy matrix D' and $J_{k2}'$ is the maximum redundancy of the updated redundancy matrix D'. Then a column and a row containing an element k2 are eliminated.

The final (n×n) redundancy matrix is a final satellite list. The satellites of the (n×n) redundancy matrix are selected as optimal satellites in step S660 and the GPS receiver assigns channels to the optimal satellites in step S665.

It can be further contemplated as another embodiment that the optimal satellites can be selected by Eq. (15) instead of updating a redundancy matrix each time one satellite is eliminated.

$$J_i' = J_i - J_{iK} \quad (15)$$

As described above, one satellite having a maximum redundancy $J_{iK}$ is eliminated from a redundancy matrix from which the redundancy $J_i$ of an ith satellite is calculated. Eq. (15) is repeated until an intended number of satellites remain.

Because redundancy is calculated with respect to satellites in pairs, elimination of one satellite having a maximum redundancy is repeated. Simultaneous elimination of a plurality of satellites from a satellite list will be compared with elimination of the satellites one by one from the satellite list.

Figure 9:
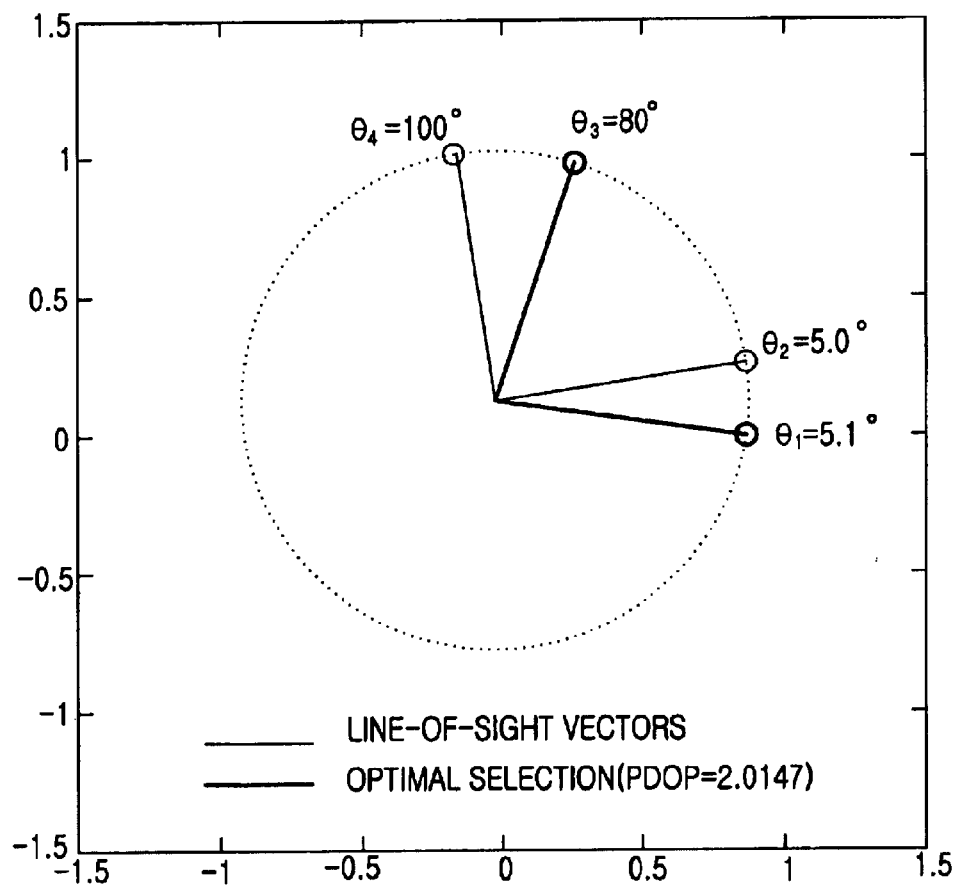
FIGS. 9 to 11C illustrate examples of satellite selections using simplified LOS vectors.

FIG. 9 illustrates simply four LOS vectors $\theta_1$ (=−5.1°), $\theta_2$ (=5.0°), $\theta_3$ (=80°), and $\theta_4$ (=100°) on a two-dimensional plane. $\theta_i$ is the direction angle of a LOS vector to an ith satellite. When two optimal LOS vectors are chosen, $\theta_1$ and $\theta_3$ are chosen by calculating GDOP for each of $_4C_2$ subsets in the conventional optimal satellite selection.

Figure 10A:
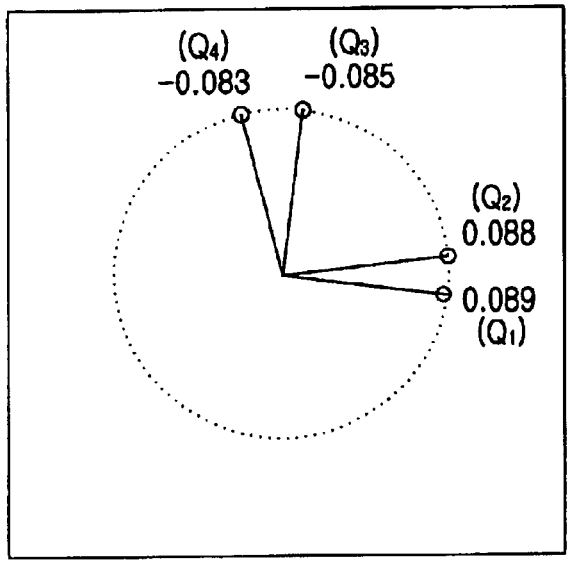
Figure 10A:
Figure 10B:
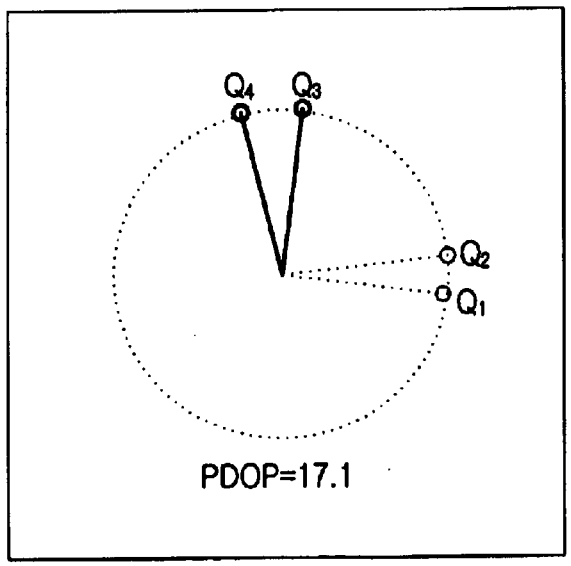
Figure 11A:
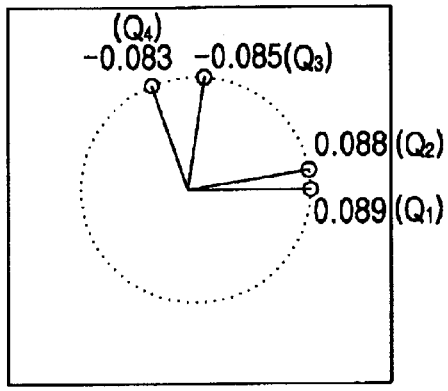
Figure 11A:

The redundancies of the LOS vectors are calculated to be 0.089, 0.008, −0.085, and −0.083, respectively as illustrated in FIG. 10A and FIG. 11A. When two vectors having maximum redundancies are chosen simultaneously, $\theta_1$ and $\theta_2$ are eliminated as illustrated in FIG. 10B. Then GDOP or PDOP (Position Dilution Of Precision) representing a navigational solution error is calculated to be 17.1 using $\theta_3$ and $\theta_4$, which is very high as compared in the optimal satellite selection.

Figure 11B:
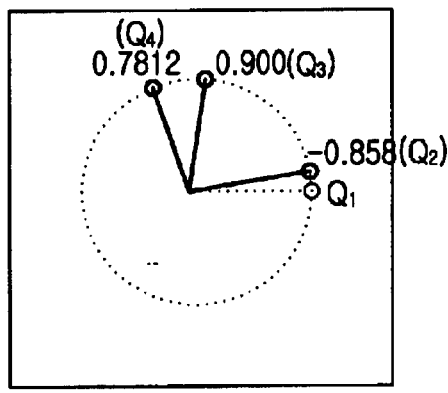
Figure 11B:
Figure 11C:
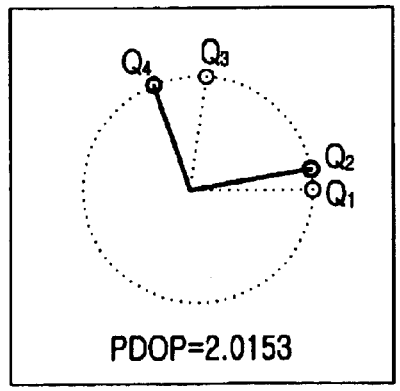

However, when the vectors are sequentially selected one by one according to an embodiment of the present invention, $\theta_1$ having a maximum redundancy 0.089 is first eliminated. The redundancies of the remaining LOS vectors $\theta_2$, $\theta_3$ and $\theta_4$ are recalculated to be −0.0858, 0.0900 and 0.7812, respectively as illustrated in FIG. 11B. After $\theta_3$ having a maxim redundancy 0.900 is then eliminated, a PDOP for the remaining vectors, that is, $\theta_2$ and $\theta_4$ is 2.0153 as illustrated in FIG. 11C, which is very close to the PDOP value achieved from the conventional optimal satellite selection method. Therefore, the effects of the optimal satellite selection are achieved with fewer operations.

Figure 12:
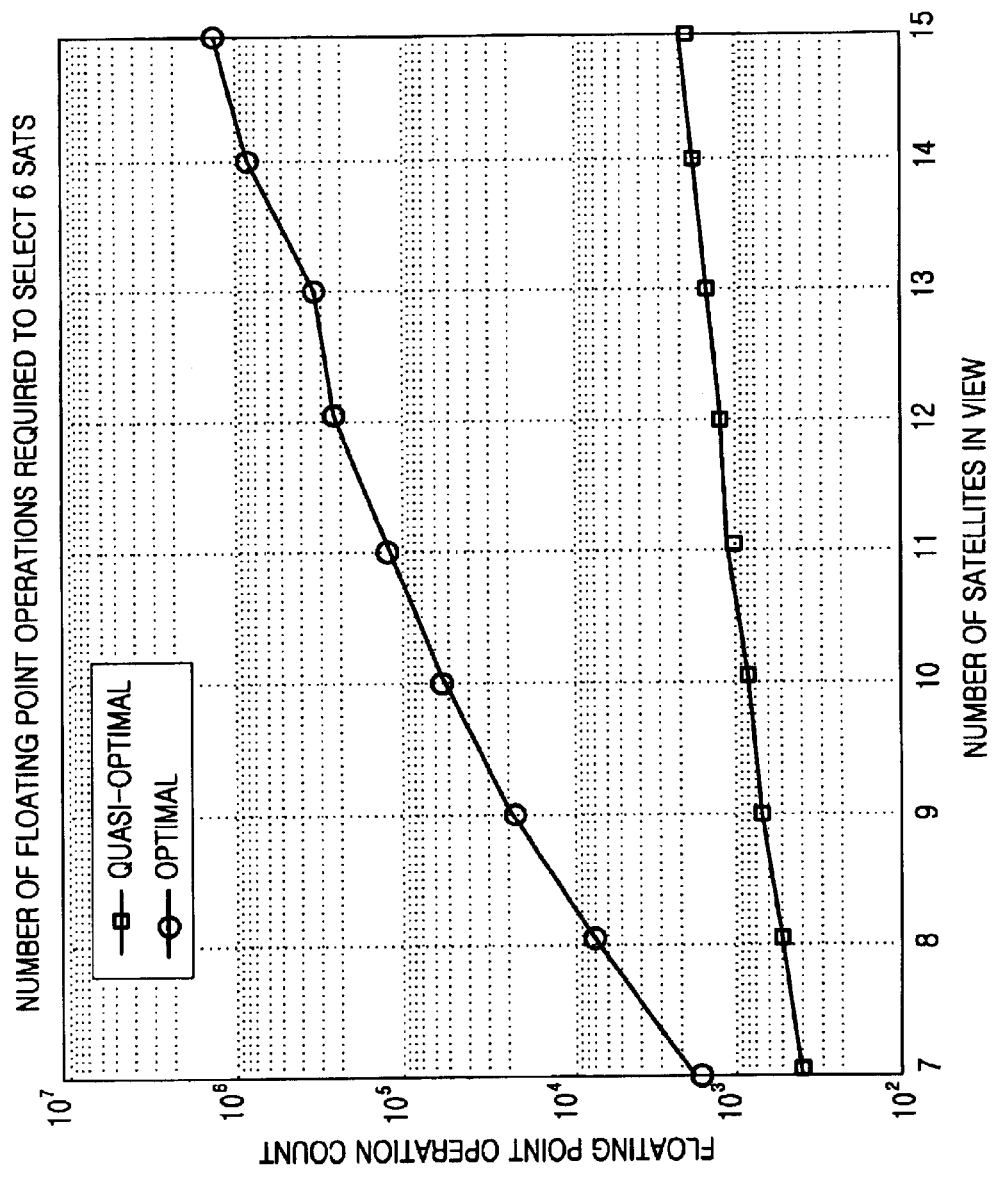
FIG. 12 illustrates a comparison in computation volume between satellite selection according to the present invention and the optimal satellite selection.

FIG. 12 illustrates a comparison in computation volume requirement between satellite selection (quasi-optimal) according to the present invention and the optimal satellite selection in a simulation. 6 satellites are selected among 7 to 15 visible satellites. Referring to FIG. 12, the quasi-optimal satellite selection requires floating point operations less than the optimal satellite selection by 10 to 1000 times. If the total number of visible satellites is 10 to 12 and 6 satellites are selected, the required computation volume can be reduced to a one hundredth.

For example, if 6 satellites are selected among 10 visible satellites, GDOP is calculated for each of $_{10}C_6$ (=210) subsets in the optimal satellite selection. This implies that 210 matrix multiplications, 210 matrix inversions and 210 scalar additions are performed. On the contrary, the quasi-optimal satellite selection allows optimal satellites to be selected using one matrix multiplication and a few scalar additions/subtractions.

Figure 13:
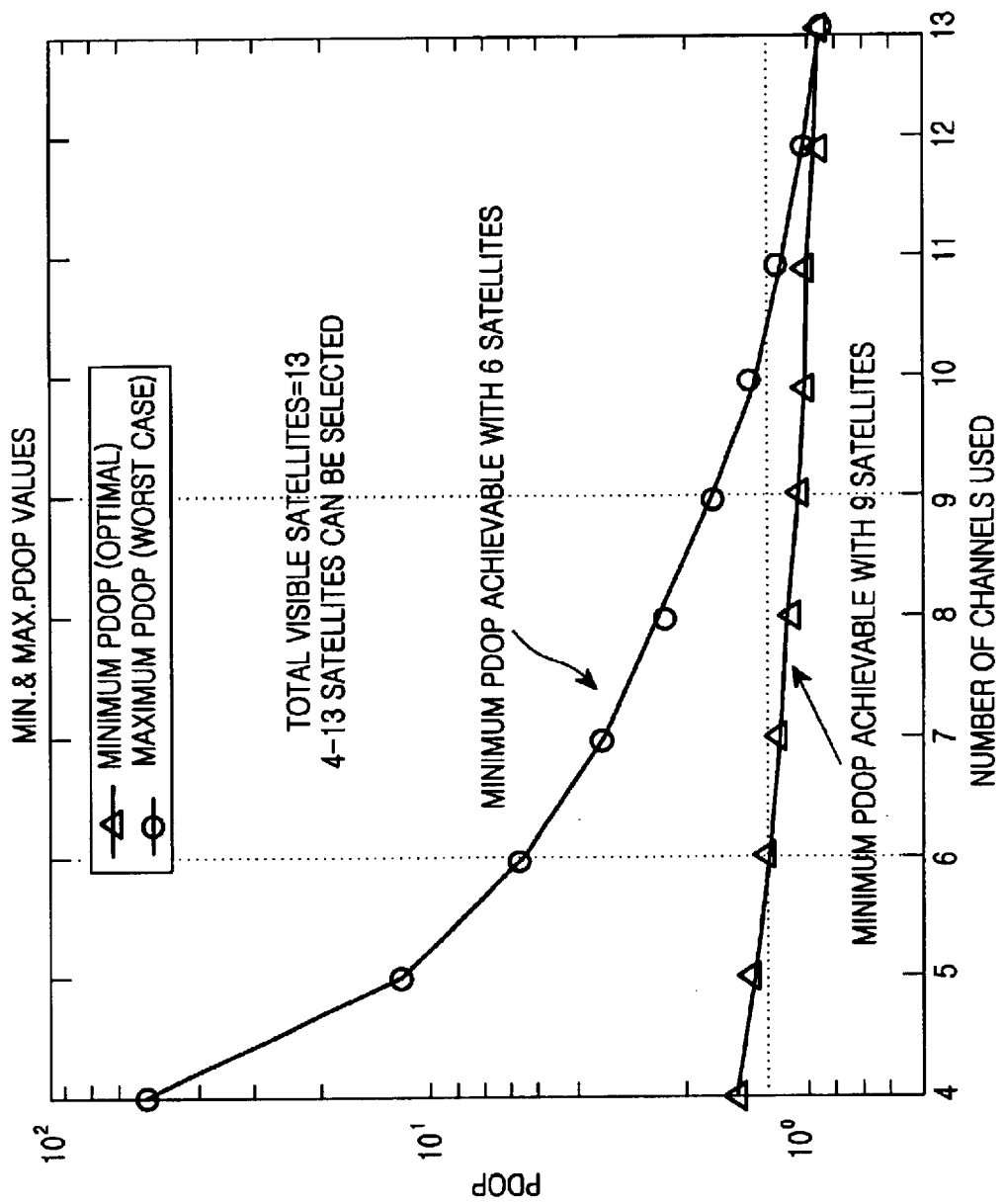
FIG. 13 illustrates variations in GDOP with respect to the number of channels used in a GPS receiver, that is, the number of satellites.

FIG. 13 illustrates changes in GDOP with respect to the number of channels used in a GPS receiver, that is, the number of satellites used. Here, 13 visible satellites exist and 4 to 13 satellites can be selected. At worst, as the number of channels decreases, PDOP increases very rapidly, which implies that a relatively large number of channels are needed within an allowed error range. However, the use of many hardware channels affects the size of a GPS receiver.

According to the present invention, even though the number of channels decreases, PDOP does not increase much. The difference in PDOP between use of 6 satellites and use of 9 satellites is only 0.35, Thus a desired error range can be satisfied using fewer hardware channels, thereby further obviating the need for matrix computation and vector computation required to achieve a navigation solution. As a result, memory capacity requirement and the size of the GPS receiver are reduced. Moreover, the use of fewer hardware channels reduces computation volume in calculating the navigational solution at a processor unit.

Figure 14A:
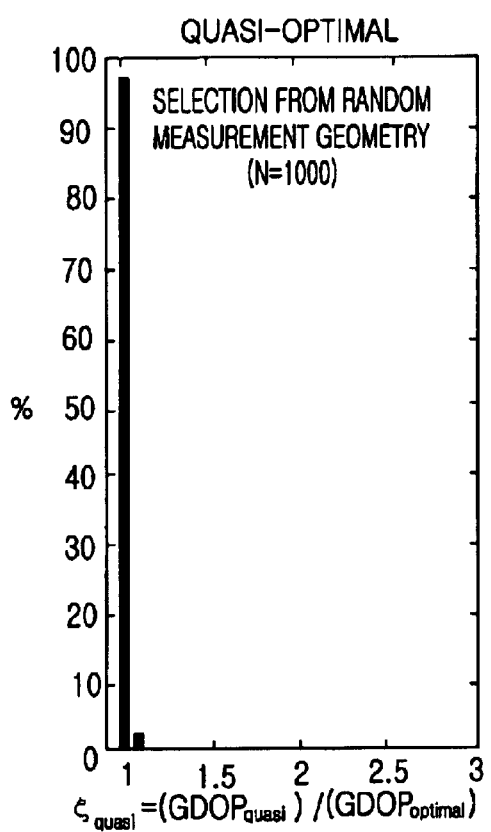
FIGS. 14A and 14B are graphs showing GDOP distributions in the satellite selection according to the present invention and the highest elevation satellite selection, respectively.
Figure 14B:
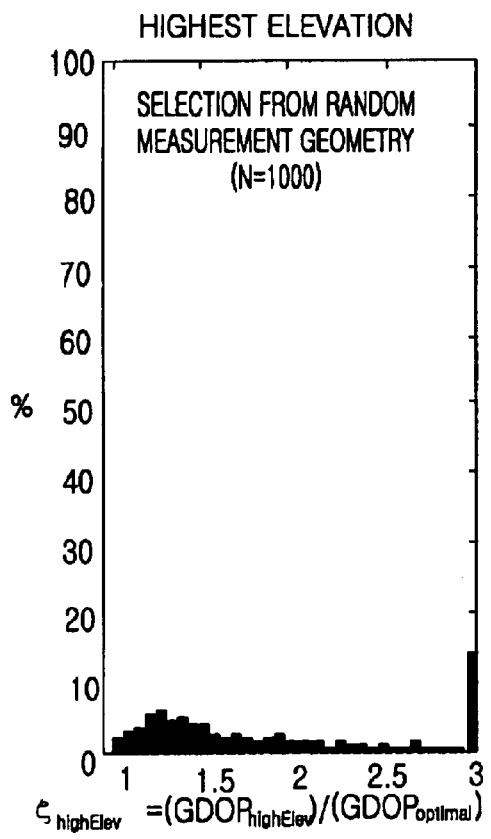

FIGS. 14A and 14B are graphs illustrating simulated GDOP distributions in the quasi-optimal satellite selection according to the present invention and the highest elevation satellite selection, respectively. 10 visible satellites are randomly distributed three-dimensionally with respect to a user and 6 of them are to be selected. A parameter $$\zeta\left(=\frac{GDOP}{GDOP_{optimal}}\right)$$

indicates the degree of discrepancy between a GDOP achieved in the present invention (quasi-optimal satellite selection) and the GDOP achieved in the conventional optimal satellite selection. As $\zeta$ approaches 1, the satellite selection becomes optimal.

As noted from FIG. 14B, the GDOP in the highest elevation satellite selection is higher than the GDOP of the optimal satellite selection by one to three times on the whole, by 3500% at the worst. On the other hand, the GDOP in the quasi-optimal elevation satellite selection is equal to the GDOP in the optimal satellite selection on the whole, merely 23% higher at the worst.

In accordance with the present invention as described above, an intended number of geometrically optimal or quasi-optimal satellites are chosen to locate an object with a minimum number of operations and minimized use of a processor. Therefore, required hardware (e.g., operation circuits and a memory) can be reduced and a GPS receiver can be made small enough to be built in a portable terminal.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of selecting GPS (Global Positioning System) satellites to locate an object using a GPS receiver, comprising:

making a satellite list including the coordinates of satellites visible in the GPS receiver;

calculating redundancies indicating respectively the degree that the satellites are overlapped with other satellites included in the satellite list using the coordinates of satellites and eliminating one satellite having a maximum redundancy from the satellite list; and assigning channels of the GPS receiver to an intended number of satellites if the intended number of satellites remain in the satellite list and, if not, repeating the calculating step.

2. The method of claim 1, wherein the calculating and eliminating step comprises: updating the satellite list by eliminating one satellite having a maximum redundancy from the satellite list; and repeating the satellite list updating step until the intended number of satellites remain in the satellite list.

3. The method of claim 1, wherein the redundancies are calculated by $$J_i = \sum_{j=1}^{N} \cos 2\theta_{ij}$$

wherein $J_i$ is a redundancy of an ith satellite, N is a number of the satellites in the satellite list, and $\theta_{ij}$ is an angle between a LOS (Line-Of-Sight) vector from the GPS receiver to the ith satellite and a LOS vector from the GPS receiver to a jth satellite.

4. The method of claim 2, wherein the redundancies are calculated by $$J_i = \sum_{j=1}^{N} \cos 2\theta_{ij} \qquad (17)$$

wherein $J_i$ is a redundancy of an ith satellite, N is a number of the satellites in the satellite list, and $\theta_{ij}$ is an angle between a LOS (Line-Of-Sight) vector from the GPS receiver to the ith satellite and a LOS vector from the GPS receiver to a jth satellite.

5. The method of claim 1, wherein the calculating step comprises:

generating a redundancy matrix having cosine values of angles between each of the satellites in the satellite list;

calculating the redundancies of the satellites by squaring each of elements in each column or row of the redundancy matrix and summing the squares;

comparing the calculated redundancies;

updating the redundancy matrix by eliminating a column and a row corresponding to a maximum redundancy from the redundancy matrix;

repeating the redundancy calculating step, the redundancy comparing step, and the redundancy matrix updating step until an intended number of satellites remain in the redundancy matrix; and updating the satellite list to have an intended number of satellites if the intended number of satellites remain.

6. A method of selecting GPS (Global Positioning System) satellites to locate an object using a GPS receiver, comprising:

making a satellite list including the coordinates of satellites visible in the GPS receiver;

calculating redundancies indicating respectively the degree that the satellite are overlapped with other satellites included in the satellite list using the coordinates of satellites;

updating the satellite list by eliminating from the satellite list one satellite having a maximum redundancy;

repeating the redundancy calculating step and the satellite list updating step for the satellite list until an intended number of satellites remain in the satellite list; and assigning channels of the GPS receiver to the intended number of satellites.

7. The method of claim 6, wherein the redundancies are calculated by $$J_i = \sum_{j=1}^{N} \cos 2\theta_{ij}$$

wherein $J_i$ is a redundancy of an ith satellite, N is a number of the satellites in the satellite list, and $\theta_{ij}$ is an angle between a LOS (Line-Of-Sight) vector from the GPS receiver to the ith satellite and a LOS vector from the GPS receiver to a jth satellite.

8. An apparatus for selecting GPS (Global Positioning System) satellites to locate an object using a GPS receiver, comprising:

an RF (Radio Frequency) unit for receiving RF signals on channels assigned to GPS satellites;

a digital unit for processing the received RF signals;

a processor unit for selecting satellites to which the channels are assigned and calculating a navigational solution using the processed signals; and a memory for storing an operating program executed in the processor unit, wherein the processor unit makes a satellite list including the coordinates of satellites visible in the GPS receiver, calculates redundancies indicating respectively the degree that the satellites are overlapped with other satellites included in the satellite list using the coordinate of satellite and, eliminates one satellite having a maximum redundancy from the satellite list, and assigns the channels of the GPS receiver to an intended number of satellites if the intended number of satellites remain in the satellite list.

9. The apparatus of claim 8, wherein the processor unit calculates the redundancies of the satellites in the satellite list, updates the satellite list by eliminating one satellite having a maximum redundancy from the satellite list, repeats redundancy calculation and satellite list updating for the satellite list until the intended number of satellites remain in the satellite list.

10. The apparatus of claim 8, wherein the redundancies are calculated by $$J_i = \sum_{j=1}^{N} \cos 2\theta_{ij}$$

wherein $J_i$ is a redundancy of an ith satellite, N is a number of the satellites in the satellite list, and $\theta_{ij}$ is an angle between a LOS (Line-Of-Sight) vector from the GPS receiver to the ith satellite and a LOS vector from the GPS receiver to a jth satellite.

11. The apparatus of claim 9, wherein the redundancies are calculated by $$J_i = \sum_{j=1}^{N} \cos 2\theta_{ij} \qquad (20)$$

wherein $J_i$ is a redundancy of an ith satellite, N is a number of the satellites in the satellite list, and $\theta_{ij}$ is an angle between a LOS (Line-Of-Sight) vector from the GPS receiver to the ith satellite and a LOS vector from the GPS receiver to a jth satellite.

* * * * *